United States Patent
Bhuwania et al.

(10) Patent No.: US 10,029,217 B2
(45) Date of Patent: Jul. 24, 2018

(54) METHODS OF MAKING CROSSLINKED MEMBRANES UTILIZING AN INERT GAS ATMOSPHERE

(71) Applicants: Nitesh Bhuwania, Richmond, CA (US); Shabbir Hussain, Emeryville, CA (US); Daniel Chinn, Danville, CA (US); John Wind, Berkeley, CA (US); Stephen Miller, San Francisco, CA (US)

(72) Inventors: Nitesh Bhuwania, Richmond, CA (US); Shabbir Hussain, Emeryville, CA (US); Daniel Chinn, Danville, CA (US); John Wind, Berkeley, CA (US); Stephen Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 424 days.

(21) Appl. No.: 14/720,397

(22) Filed: May 22, 2015

(65) Prior Publication Data

US 2016/0339397 A1 Nov. 24, 2016

(51) Int. Cl.
*B05D 3/04* (2006.01)
*B01D 71/64* (2006.01)
(Continued)

(52) U.S. Cl.
CPC ........... *B01D 71/64* (2013.01); *B01D 53/228* (2013.01); *B01D 63/02* (2013.01);
(Continued)

(58) Field of Classification Search
CPC ...... B01D 71/64; B01D 53/228; B01D 63/02; B01D 67/0002; B01D 67/0006;
(Continued)

(56) References Cited

U.S. PATENT DOCUMENTS

| 6,755,900 B2 | 6/2004 | Koros et al. |
| 6,932,859 B2 | 8/2005 | Koros et al. |

(Continued)

FOREIGN PATENT DOCUMENTS

| EP | 0643088 | 3/1995 |
| WO | 2015030594 | 3/2015 |

OTHER PUBLICATIONS

Chen et al. "Characterization of Thermally Cross-Linkable Hollow Fiber Membranes for Natural Gas Separation" Industrial & Engineering Chemistry Research 2013, 52, 1015-1022. (Year: 2013).*
Ekiner O.M. et al., Journal of Membrane Science 53 (1990) 259-273.
Koms and Fleming, Journal of Membrane Science, 83, 1-80 (1993).
PCT/US2016/031563 International Search Report.

*Primary Examiner* — Robert S Walters, Jr.
(74) *Attorney, Agent, or Firm* — Melissa M. Hayworth; E. Joseph Gess; Susan M. Abernathy

(57) ABSTRACT

Disclosed herein is a method of making a crosslinked membrane such as a crosslinked hollow fiber membrane. The method comprises (a) preparing a polyimide polymer comprising carboxylic acid functional groups from a reaction solution comprising monomers and at least one solvent; (b) treating the polyimide polymer with a diol at esterification conditions to form a monoesterified polyimide polymer; (c) forming a monoesterified polyimide membrane or dense film from the monoesterified polyimide polymer; and (d) subjecting the monoesterified polyimide membrane or dense film to transesterification conditions under a $CO_2$ atmosphere to form a crosslinked polyimide membrane or dense film.

21 Claims, 3 Drawing Sheets

(51) Int. Cl.
*B01D 69/12* (2006.01)
*B01D 67/00* (2006.01)
*B01D 53/22* (2006.01)
*B01D 63/02* (2006.01)

(52) U.S. Cl.
CPC ..... *B01D 67/0002* (2013.01); *B01D 67/0006* (2013.01); *B01D 67/0093* (2013.01); *B01D 69/125* (2013.01); *B01D 2053/224* (2013.01); *B01D 2256/245* (2013.01); *B01D 2257/504* (2013.01); *B01D 2323/08* (2013.01); *B01D 2323/10* (2013.01); *B01D 2323/30* (2013.01); *B01D 2325/20* (2013.01); *Y02C 10/10* (2013.01)

(58) Field of Classification Search
CPC .............. B01D 67/0093; B01D 69/125; B01D 2053/224; B01D 2256/245; B01D 2257/504; B01D 2323/08; B01D 2323/10; B01D 2323/30; B01D 2325/20; Y02C 10/10
See application file for complete search history.

(56) References Cited

U.S. PATENT DOCUMENTS

| | | | |
|---|---|---|---|
| 7,247,191 B2 | 7/2007 | Koros et al. | |
| 7,553,008 B2 | 6/2009 | Jones | |
| 7,981,794 B2 | 7/2011 | Narushima et al. | |
| 7,981,974 B2 | 7/2011 | Miller et al. | |
| 8,066,799 B2 | 11/2011 | Miller et al. | |
| 8,328,906 B2 | 12/2012 | Miller et al. | |
| 8,394,182 B2 | 3/2013 | Koros et al. | |
| 8,449,651 B2 | 5/2013 | Husain | |
| 8,734,567 B2 | 5/2014 | Husain | |
| 2009/0165645 A1* | 7/2009 | Wind | B01D 53/22 95/51 |
| 2010/0133192 A1 | 6/2010 | Liu et al. | |
| 2013/0165573 A1* | 6/2013 | Kojima | G02B 1/04 524/413 |
| 2015/0000528 A1 | 1/2015 | Lee et al. | |
| 2015/0093510 A1 | 4/2015 | Liu et al. | |
| 2015/0094429 A1 | 4/2015 | Liu et al. | |
| 2015/0094500 A1 | 4/2015 | Liu et al. | |

\* cited by examiner

US 10,029,217 B2

METHODS OF MAKING CROSSLINKED MEMBRANES UTILIZING AN INERT GAS ATMOSPHERE

FIELD OF TECHNOLOGY

This disclosure relates to methods of making crosslinked membranes, including crosslinked hollow fiber membranes, utilizing an inert gas atmosphere, in particular a $CO_2$ atmosphere, during the transesterification step.

INTRODUCTION

Polymeric membranes for separating mixtures of gases, such as methane and carbon dioxide are known. For example, U.S. Pat. Nos. 7,247,191; 6,932,859; 6,755,900; 7,981,974; 8,066,799; and 8,328,906, which documents are incorporated by reference herein in their entireties, teach crosslinkable polymers and crosslinked hollow fiber membranes made from such crosslinkable polymers. These patents particularly describe a crosslinkable polyimide polymer. The crosslinkable polyimide polymer can be made by monoesterifying a polyimide polymer with a crosslinking agent.

A crosslinked hollow fiber membrane can be made by forming fibers from the crosslinkable polyimide polymer and transesterifying the crosslinkable polyimide polymer within the fibers. More specifically, the crosslinkable polyimide polymer can be formed into crosslinkable fibers, which are then subjected to transesterification conditions to create covalent ester crosslinks between the crosslinkable polyimide polymer within the fibers. Crosslinked hollow fiber membranes can be incorporated into a separation module. Other types of membranes for separation include flat sheet separation membranes or flat stack permeators.

Separation modules utilizing hollow fiber membranes include a larger surface area per unit volume compared to other separation modules utilizing flat sheet or flat stack permeators. Therefore, hollow fiber separation modules have significant separation capability even in a reasonably compact size module. Module size is important in implementing separation modules on offshore platforms, where space and weight are at a premium, to separate mixtures of gases from hydrocarbon producing wells.

The crosslinked hollow fiber membranes have good selectivity; however, the transesterification conditions to create covalent ester crosslinks between the crosslinkable polyimide polymer within the fibers causes a huge drop in permeance. The permeance loss in a crosslinked hollow fiber can be, for example, about 50% or even as high as around 70% or higher, compared to the uncrosslinked hollow fiber permeance.

Therefore, there remains a need for methods of making crosslinked membranes, including crosslinked hollow fiber membranes, which do not experience such significant permeance loss during transesterification.

SUMMARY

Disclosed herein is a method of making a crosslinked polyimide membrane or dense film. The method comprises (a) preparing a polyimide polymer comprising carboxylic acid functional groups from a reaction solution comprising monomers and at least one solvent; (b) treating the polyimide polymer with a diol at esterification conditions to form a monoesterified polyimide polymer; (c) forming a monoesterified polyimide membrane or dense film from the monoesterified polyimide polymer; and (d) subjecting the monoesterified polyimide membrane or dense film to transesterification conditions under a $CO_2$ atmosphere to form a crosslinked polyimide membrane or dense film.

The crosslinked polyimide membrane can be a crosslinked hollow fiber membrane, a crosslinked flat sheet membrane and the like.

Transesterification under the $CO_2$ atmosphere advantageously provides crosslinked polyimide membranes having better permeance (e.g., $CO_2$ permeance) than crosslinked membranes produced with transesterification under a vacuum atmosphere. Furthermore, transesterification under the $CO_2$ atmosphere can advantageously provide crosslinked membranes having comparable selectivity (e.g., $CO_2/CH_4$ selectivity) to crosslinked membranes produced with transesterification under a vacuum atmosphere.

DETAILED DESCRIPTION

The method involves (a) preparing a polyimide polymer comprising carboxylic acid functional groups from a reaction solution comprising monomers and at least one solvent; (b) treating the polyimide polymer with a diol at esterification conditions to form a monoesterified polyimide polymer; (c) forming a monoesterified polyimide membrane or dense film from the monoesterified polyimide polymer; and (d) subjecting the monoesterified polyimide membrane or dense film to transesterification conditions under an inert gas atmosphere to form a crosslinked polyimide membrane or dense film.

The crosslinked polyimide membrane can be a crosslinked hollow fiber membrane, a crosslinked flat sheet membrane and the like.

The inert gas atmosphere can be an atmosphere of any inert gas or an atmosphere of mixed inert gases. For example, the inert gas can be $CO_2$, $N_2$, argon, helium, and the like, and mixtures thereof. In certain embodiments, the inert gas atmosphere can be a $CO_2$ atmosphere, $N_2$ atmosphere, or a mixed $CO_2$ and $N_2$ atmosphere. In some embodiments, the inert gas atmosphere is a $CO_2$ atmosphere.

The crosslinked membrane is suitable for separating fluid mixtures, including both gaseous mixtures and liquid mixtures.

Figure 1:
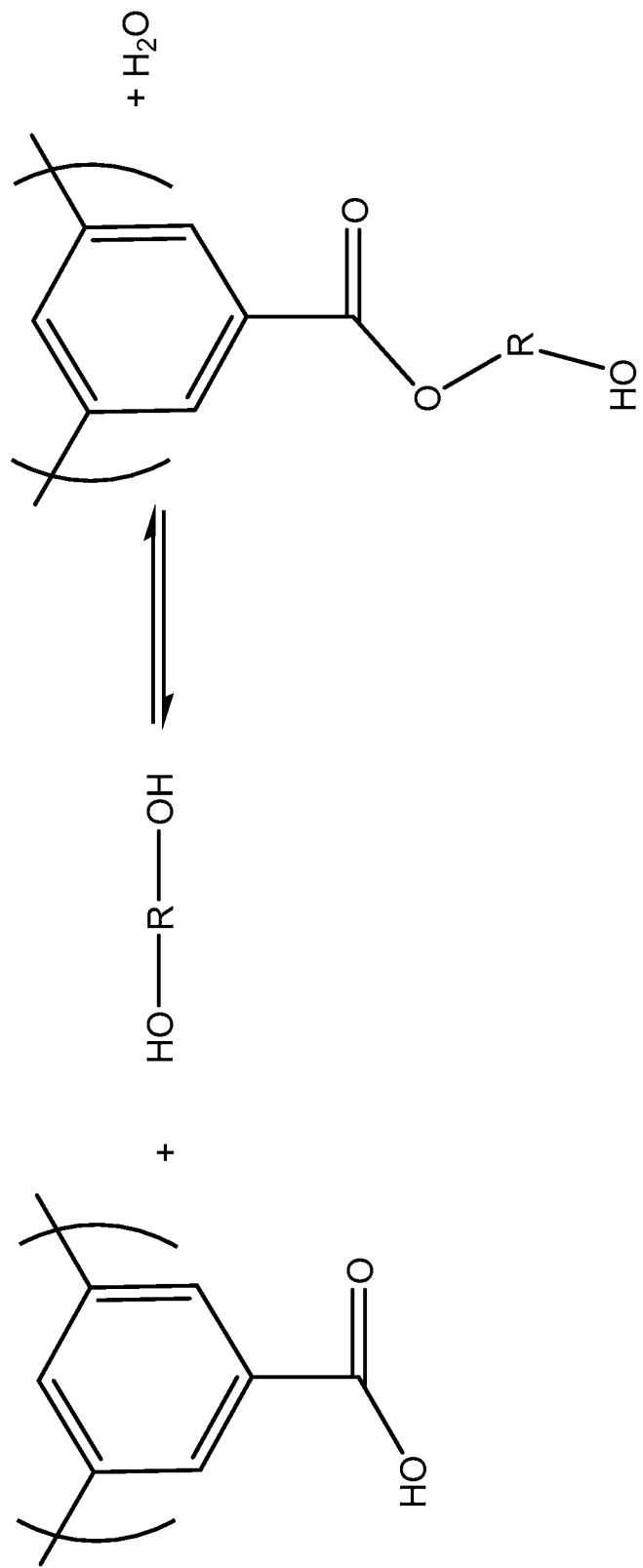
FIG. 1 illustrates monoesterification.

During step (b), carboxylic acid functional groups of the polyimide polymer react with the diol to form ester groups in the polyimide polymer and water as a by-product as illustrated in FIG. 1. Step (b) is referred to herein as monoesterification.

Figure 2:
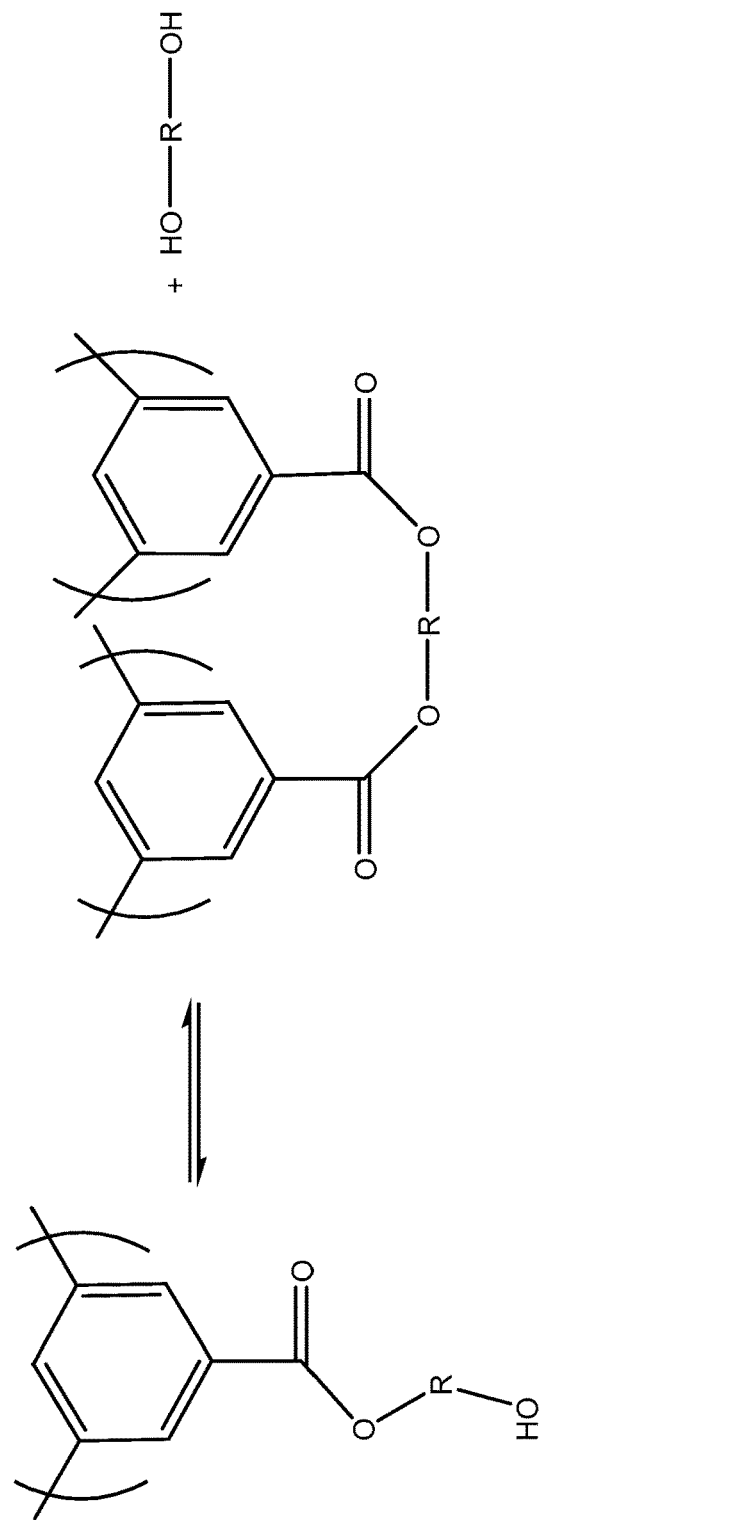
FIG. 2 illustrates transesterification.

During step (d), esters in one monoesterified polyimide polymer chain react with esters in another monoesterified polyimide polymer chain to form a transester or crosslink as illustrated in FIG. 2. Step (d) is referred to herein as transesterification. Diol molecules form as by-products during transesterification.

In processes for forming crosslinked membranes transesterification typically involves heating under a vacuum atmosphere. However, such transesterification under a vacuum atmosphere results in decreased permeance and may not achieve a crosslinked membrane with an acceptable permeance. It has been surprisingly discovered that subjecting the monoesterified polyimide membrane or dense film to transesterification conditions under an inert gas atmosphere, and in particular $CO_2$, provides a crosslinked polyimide membrane or dense film with improved permeance.

Without being bound by theory, it is believed that under a vacuum atmosphere there is a lack of convective flow to facilitate removal of the by-product diol molecules formed during transesterification from the hollow fiber substructure pores. Removal of the by-product diol molecules facilitates transesterification by moving the equilibrium reaction forward enhancing both the crosslinking density and gas permeance. Under a $CO_2$ atmosphere, the diol molecules may be more effectively removed. Removal of the by-product diol molecules from the fiber substructure pores can also provide access for $CO_2$ or other inert gas molecules and thus reduce loss of free volume in crosslinked membrane. For these reasons, it has been surprisingly discovered that transesterification under inert gas atmosphere, and specifically $CO_2$ atmosphere, provides improved permeance for the crosslinked polyimide membrane.

The method of making a crosslinked membrane disclosed herein involves transesterification conditions under an inert gas atmosphere, and specifically under a $CO_2$ atmosphere. This method provides a crosslinked membrane with better permeance than a membrane obtained using a vacuum atmosphere.

Definitions

The following terms are used throughout the specification and have the following meanings unless otherwise indicated.

The term "aliphatic" refers to non-aromatic organic compounds, in which carbon atoms are joined together in straight or branched chains. Aliphatic includes paraffinic (e.g., alkyl), olefinic (e.g., alkenyl), and alkynyl compounds.

The term "alkenyl" refers to a linear or branched unsaturated monovalent hydrocarbon group having 2 to 12 carbon atoms and containing at least one, for example, from 1 to 3 double bond(s). This term is exemplified by groups such as ethenyl (—CH═$CH_2$), 2-propenyl (—$CH_2$—CH═$CH_2$), and the like.

The term "alkoxy" refers to an alkyl group linked to an oxygen such as, for example, methoxy (—$OCH_3$) or ethoxy (—$OCH_2CH_3$).

The term "alkyl" means a straight-chain or branched saturated monovalent hydrocarbon group of one to twelve carbon atoms (e.g. methyl, ethyl, i-propyl, and the like). Alkyl groups have the formula $C_nH_{2n+1}$ where n is a positive non-zero integer.

The term "alkynyl" refers to a linear or branched monovalent hydrocarbon group having 2 to 12 carbon atoms and containing at least one, for example, from 1 to 3 triple bond(s). This term is exemplified by groups such as ethynyl (—C≡CH), 2-propynyl (—$CH_2$—C≡CH), n-butynyl (—$CH_2$—$CH_2$—C≡CH), and the like.

The term "amide" means a functional group having a carbonyl group (C═O) linked to a nitrogen atom or a compound that includes this functional group.

The term "amino" means a functional group having the formula —NR'R" where R' and R" are independently H, alkyl, cycloalkyl, and aryl.

The term "antilyotropic salt" refers to a salt that interacts with solvent molecules rather than polymer molecules. See Ekiner O. M. et al., *Journal of Membrane Science* 53 (1990) 259-273.

The term "aryl" refers to an unsaturated aromatic carbocyclic group of from 6 to 20 carbon atoms having a single ring (e.g., phenyl) or multiple condensed (fused) rings (e.g., naphthyl or anthryl). Exemplary aryls include phenyl, naphthyl and the like.

A "Barrer" is defined as follows: 1 Barrer=$(10^{-10}$ $cm^3$ (STP)×cm)/($cm^2$×sec.×(cm. Hg)). The flux is in units of $cm^3/cm^2$×sec. at standard temperature and pressure, the thickness is in units of cm, and the pressure or driving force is in units of cm. Hg. For dense membrane films of known thickness, barrer are typically reported.

The productivity (permeance) of a gas separation membrane is measured in GPUs. A "GPU" is defined as follows:

$$GPU = \frac{10^{-6} \times cm^3 (STP)}{cm^2 \times sec. \times (cm \cdot Hg)}$$

Permeance is the flux without a thickness normalizing factor, and thus normalized by the pressure difference across the membranes.

The term "carbodiimide" means a chemical compound containing the functional group N═C═N.

The term "carboxylic acid functional group" refers to a pendant group of —COOH—.

The term "$CO_2$ atmosphere" refers to a non-reactive gas atmosphere including a majority of $CO_2$ (i.e., greater than 50% $CO_2$) and optionally additionally including a non-reactive gas selected from the group consisting of nitrogen, argon, helium, and combinations thereof. Thus, the "$CO_2$ atmosphere" can contain 100% $CO_2$ or less than 100% $CO_2$. When the $CO_2$ atmosphere contains 100% $CO_2$, the pressure of the atmosphere is referred to herein as "$CO_2$ pressure." When the $CO_2$ atmosphere contains less than 100% $CO_2$, the pressure of $CO_2$ in the atmosphere is referred to herein as "$CO_2$ partial pressure."

The term "cycloalkyl" means a cyclic saturated monovalent hydrocarbon group containing 3 to 12 carbon atoms having a single cyclic ring or multiple condensed rings. Such cycloalkyl groups include, by way of example, cyclopropyl, cyclohexyl, cyclooctyl, adamantanyl, and the like.

The term "diamino cyclic compound" means a chemical compound having a ring structure of three to twelve carbon atoms where the ring structure is functionalized by two amino or substituted amino groups.

The term "dianhydride" refers to any compound that contains two anhydride

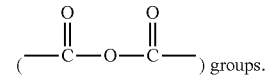
 groups.

The term "diol" refers to a chemical compound containing two hydroxyl groups.

The term "draw ratio" means the ratio of the take-up rate to the extrusion rate.

The term "ester" means a functional group having a carbonyl group (C═O) linked to a alkoxy group.

The term "halogenated alkyl" means a straight-chain or branched saturated monovalent hydrocarbon group of one to twelve carbon atoms, wherein at least one of the carbon atoms is replaced by a halogen atom (e.g. fluoromethyl, 1-bromo-ethyl, 2-chloro-pentyl, 6-iodo-hexyl, and the like).

The term "inert gas" means a gas which does not undergo chemical reactions under the transesterification conditions herein. As such, an inert gas atmosphere includes $CO_2$, $N_2$, Ar, He, and the like, and mixtures thereof. In certain embodiments, the inert gas used herein is $CO_2$.

The term "molecular weight" or "average molecular weight" means weight average molecular weight as measured by Gel Permeation Chromatography (GPC) using polystyrene as the standard. This method is described in ASTM D5296-05.

The term "$N_2$ atmosphere" refers to a non-reactive gas atmosphere including a majority of $N_2$ (i.e., greater than 50% $N_2$) and optionally additionally including a non-reactive gas selected from the group consisting of carbon dioxide, argon, helium, and combinations thereof. Thus, the "$N_2$ atmosphere" can contain 100% $N_2$ or less than 100% $N_2$.

The term "mixed $CO_2$ and $N_2$ atmosphere" refers to a non-reactive gas atmosphere including $CO_2$ and $N_2$. The mixed $CO_2$ and $N_2$ atmosphere can optionally additionally include a non-reactive gas selected from the group consisting of argon, helium, and combinations thereof.

The term "permeability" or P refers to a pressure- and thickness-normalized flux of a given component such as $CO_2$. Permeability can be measured, for example, in Barrers.

The term "permeance" is the flux without a thickness normalizing factor, and thus normalized by the pressure difference across the membranes. Permeance can be measured, for example, in GPU.

The term "phenyl" means an aromatic group of six carbon atoms having the formula —$C_6H_5$.

The term "reduce" means to decrease or diminish.

The term "selectivity" with membranes refers to the ratio of the permeabilities of two components across a membrane (i.e., $P_A/P_B$, where A and B are the two components). For fibers, it is also a ratio of permeances.

Step (a)—Preparing Polyimide Polymer

Step (a) involves preparing a polyimide polymer comprising carboxylic acid functional groups from a reaction solution comprising monomers and at least one solvent. The monomers and at least one solvent are combined such that the monomers dissolve in the solvent to form the reaction solution. Thereafter, the monomers polymerize through the formation of amide bonds to provide a polyamide polymer. The polyamide polymer is then subjected to imidization conditions whereby the amide bonds are converted to imide rings in an imidization reaction to provide a polyimide polymer.

The imidization reaction of step (a) can further take place under dehydrating conditions. Water is produced as a by-product during the imidization reaction. Such dehydrating conditions at least partially remove this water by-product from the reaction solution. It is desirable to remove water in step (a) because water produced during the imidization reaction can degrade the imide rings of the polyimide polymer during the subsequent monoesterification reaction. This residual imidization water can also cause chain scissioning of the polyimide polymer as can the water produced during the monoesterification reaction. While the polyimide polymer could be precipitated out of the reaction solution as in conventional processes and then subjected to monoesterification, including dehydrating conditions in step (a) makes such a precipitation step unnecessary and the entire reaction can be a "one-pot" synthesis.

Monomers

The monomers can comprise from about 15 to about 25 weight percent of the reaction solution.

It is important that at least some of the monomers include carboxylic acid functional groups such that the resultant polyimide polymer comprises carboxylic acid functional groups. The diamino monomers can include diamino cyclic compounds and diamino aromatics.

For example, the monomers can include dianhydride monomers A, diamino monomers without carboxylic acid functional groups B, and diamino monomers with carboxylic acid functional groups C. If the monomers are comprised of the monomers A, B, and C, the ratio of B to C can be from 1:4 to 8:1.

The monomer A can be a dianhydride of formula (I):

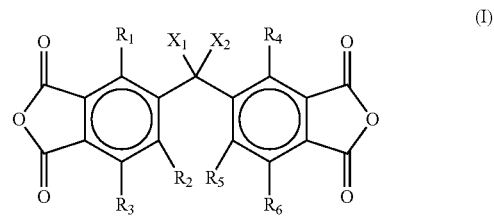

wherein $X_1$ and $X_2$ are independently halogenated alkyl, phenyl or halogen; and $R_1$, $R_2$, $R_3$, $R_4$, $R_5$, and $R_6$ are independently H, alkyl, or halogen.

The monomer A can be 4,4'-(hexafluoroisopropylidene) diphthalic anhydride (6FDA), which is also known as (2,2-bis(3,4-dicarboxyphenyl) hexafluoropropane. 6FDA has the following formula:

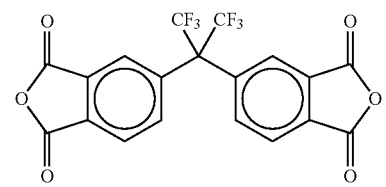

Including 6FDA in the monomers provides stability to the polyimide polymer because 6FDA has limited rotational ability.

Monomers with limited rotational ability, like 6FDA, are desirable because they increase the selectivity of the membrane made according to the method disclosed herein. Monomers with bulky side groups, like $(CF_3)_2$ in 6 FDA, also inhibit chain packing, which increases permeance of molecules through the membrane. Both selectivity and permeance are important for efficient and productive separations. Further reference to these structure property relationships can be found in Koros and Fleming, *Journal of Membrane Science*, 83, 1-80 (1993), herein incorporated by reference in its entirety.

The monomer B can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenezene, tetramethyldiaminobenzene, 2,4,6-trimethyl-m-phenylene-diamine (DAM), or combinations thereof. DAM is represented by the following formula:

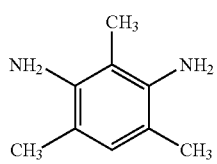

The monomer C can be diamino benzoic acid. It is represented by the following formula:

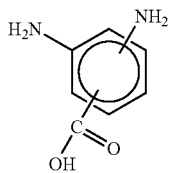

More specifically, the monomer C can be 3,5 diaminobenzoic acid (DABA).

In one embodiment of the method as described herein, the monomers include A, B, and C, where A is 6FDA, B is DAM, and C is DABA.

Whichever monomers are used, according to some embodiments of the method as described herein, they can be purified prior to step (a). The monomers can be purified by techniques known in the art, for example, sublimation or recrystallization.

Solvents

The monomers are dissolved in at least one solvent to create a reaction solution and facilitate polymerization. The resulting polyamide polymer remains in the reaction solution for imidization. The at least one solvent can comprise from about 75 to about 95 weight percent of the reaction solution. The at least one solvent can be at least one high boiling organic solvent. The solvent can also be mixtures of organic solvents. Exemplary high boiling organic solvents are listed in Table 1 along with their normal boiling points.

TABLE 1

| High boiling organic solvent | Normal boiling point (° C.) |
| --- | --- |
| N-Methyl-2-pyrrolidione (NMP) | 202.1 |
| Dimethyl sulfoxide (DMSO) | 190 |
| Dimethylformamide (DMF) | 152.9 |
| Dimethylacetamide (DMAc) | 165.1 |
| Diglyme | 162 |

Accordingly, the solvent of the reaction solution can be any one of the organic solvents listed above or mixtures thereof. High boiling solvents are desirable because they prevent excessive evaporation, which would significantly alter concentrations in the reaction solution and concentrations during subsequent processing.

Dehydrating Conditions

If dehydrating conditions are utilized during step (a) to remove water, the concentration of water in the reaction solution can be maintained at from about 0 weight percent to about 0.26 weight percent.

The dehydrating conditions can be the presence of a chemical dehydrating agent only, a mechanical dehydrating agent only, or the combination of a chemical dehydrating agent and a mechanical dehydrating agent.

If a chemical dehydrating agent is utilized, the chemical dehydrating agent does not impede the imidization reaction of step (a). For example, it does not decrease the imidization reaction rate or decrease the polyimide polymer yield.

The chemical dehydrating agent can form an azeotrope with water, which can be boiled out of the reaction solution. Such azeotropic chemical dehydrating agents are well known to one of ordinary skill in the art. Exemplary azeotropic chemical dehydrating agents include xylene, ortho-dichlorobenzene (ODCB), benzene, toluene, and mixtures thereof. Alternatively, the chemical dehydrating agent can be a carbodiimide.

If an azeotropic chemical dehydrating agent is used as the chemical dehydrating agent, it can be used in relatively large amounts, for example, from about 1 ml to about 4 ml per gram of the polyamide polymer, Such a large amount of azeotropic chemical dehydrating agent ensures that the water produced by the imidization reaction is removed from the reaction solution.

If a carbodiimide is used as the chemical dehydrating agent, it can be used in an amount from about 1 to about 4 times the stoichiometric amount based on moles of water removed.

The chemical dehydrating agent can also be periodically added to the reaction solution throughout step (a). For example, ODCB can be added periodically. According to one embodiment of the method as described herein, the chemical dehydrating agent is added to the reaction solution in three separate batches.

If a mechanical dehydrating agent is utilized, the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the reaction solution from returning to the reaction solution can be suitable.

Polymerization Conditions

In the polymerization reaction of step (a), monomers polymerize in the reaction solution to form a polyamide polymer. Polymerization can occur at room temperature while the reaction solution is stirred or otherwise agitated. Solvent concentration during polymerization is from about 75 to about 95 weight percent of the reaction solution.

Imidization Conditions

In the imidization reaction of step (a), the amide bonds of the polyamide polymer form imide rings to provide the polyimide polymer. The imidization reaction in step (a) occurs over an extended period of time, approximately 12-36 hours. Such an extended period of time ensures that the imidization reaction proceeds to completion, which is important with respect to yield of the polyimide polymer. The imidization reaction can be a thermal imidization reaction and can occur at temperatures from about 160° C. to about 200° C. Solvent concentration during imidization is from about 75 to about 95 weight percent of the reaction solution.

Step (b)—Monoesterification Reaction

Step (b) involves treating the polyimide polymer with a diol at esterification conditions to form a monoesterified polyimide polymer. More specifically, in step (b), the carboxylic acid functional groups (—COOH) of the polyimide polymer react with the hydroxyl functional groups (—OH) of the diol to convert the —COOH groups to esters. This provides a monoesterified polyimide polymer and water as a by-product. Each diol molecule contains two —OH groups. During monoesterification, only one of the —OH groups of each diol molecule reacts with a —COOH group. Ideally, the conversion of —COOH groups to esters (i.e. the ester yield) is approximately 100%. However, in some cases, the ester yield can be less than 100%. Any unconverted —COOH groups can act as crosslinkable sites in a later transesterification reaction whereby monoesterified polyimide polymer chains are crosslinked.

After the imidization reaction of step (a) is complete, the reaction solution comprises the polyimide polymer, the at least one solvent, and any unreacted monomers. The diol can be directly added to the reaction solution as a crosslinking agent to form a monoesterification reaction solution. Thus, both the imidization reaction of step (a) and the monoesterification reaction of step (b) can take place in one reaction vessel or "one pot." Alternatively, the polyimide polymer can be isolated and then combined with the diol to form a monoesterification reaction solution such that the imidization reaction of step (a) and the monoesterification reaction of step (b) take place in separate reaction vessels.

Step (b) can take place under dehydrating conditions to at least partially remove water produced as a by-product during the monoesterification reaction. Dehydrating conditions can partially maintain, fully maintain, or even increase the average molecular weight of the monoesterified polyimide polymer.

Step (b) can take place in the presence of an acid catalyst to facilitate the monoesterification reaction. When the acid catalyst is present in an amount less than that typically used in conventional monoesterification reactions without water removal, the monoesterified polyimide polymer partially retains, fully retains, or even increases its molecular weight.

The monoesterified polyimide polymer produced by step (b) can have an average molecular weight from about 40,000 to about 400,000. In one embodiment, the monoesterified polyimide polymer has an average molecular weight from about 80,000 to about 300,000. In another embodiment, the monoesterified polyimide polymer has an average molecular weight from about 100,000 to about 300,000. The monoesterified polyimide polymer can also have a polydispersity index from about 2 to about 4.

Diol

In the present method, the length of the diol is an important consideration. If the diol is too long or too short, it can decrease the permeance and/or selectivity of a membrane formed from the monoesterified, polyimide polymer.

Diols useful in the method as described herein include ethylene glycol, propylene glycol, 1,3 propanediol, 1,4 butanediol, 1,2 butanediol, benzenedimethanol, 1,3 butanediol, and mixtures thereof. In one embodiment of the method as described herein, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3 propanediol, and mixtures thereof. In yet another embodiment, the diol is selected from the group consisting of ethylene glycol, 1,3 propanediol, and mixtures thereof. In still another embodiment, the diol is 1,3 propanediol.

Dehydrating Conditions

As with the optional dehydrating conditions of step (a), the optional dehydrating conditions of step (b) can be a chemical dehydrating agent alone, a mechanical dehydrating agent alone, or the combination of a chemical dehydrating agent and a mechanical dehydrating agent. If dehydrating conditions are used, it is desirable that the dehydrating conditions remove water produced during step (b) from the monoesterification reaction solution such that the concentration of water in the monoesterification reaction solution is maintained at from about 0 weight percent to about 0.08 weight percent.

If a chemical dehydrating agent is utilized, the chemical dehydrating agent does not impede the monoesterification reaction of step (b). For example, it does not decrease the monoesterification reaction rate or decrease the monoesterified, polyimide polymer yield. The chemical dehydrating agent can be an azeotropic chemical dehydrating agent or can be a carbodiimide.

An azeotropic chemical dehydrating agent forms an azeotrope with the water by-product, which can be boiled out of the monoesterification reaction solution. Such azeotropic chemical dehydrating agents are well known to those of ordinary skill in the art and include xylene, ODCB, benzene, toluene, and mixtures thereof.

Figure 3:
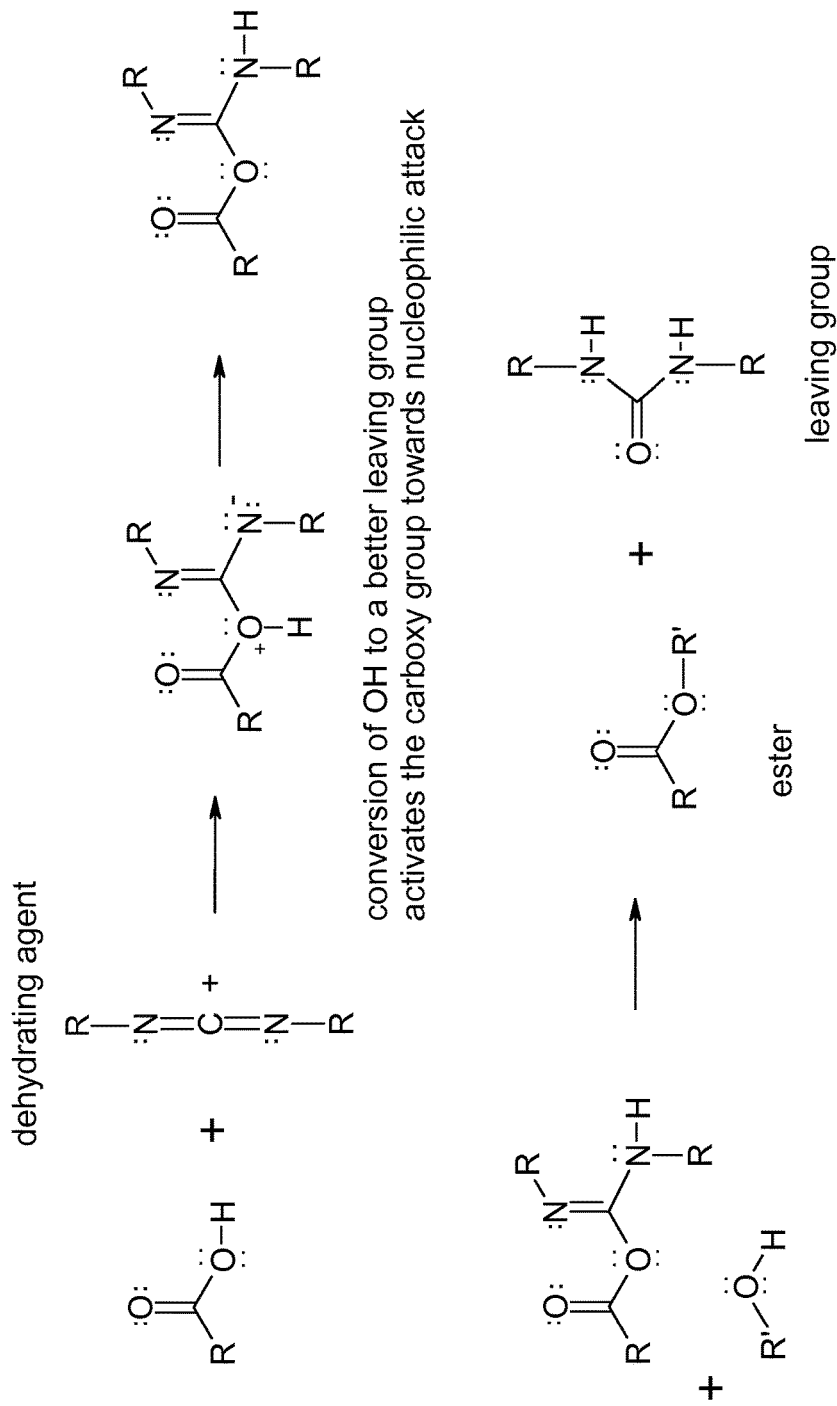
FIG. 3 illustrates a dehydration reaction mechanism during monoesterification with a carbodiimide as a chemical dehydrating agent.

A carbodiimide functions as a chemical dehydrating agent by participating in the monoesterification reaction by activating the carboxylic acid functionality of the polyimide polymer toward ester formation and thereby eliminating the water by-product at the same time. This carbodiimide dehydration reaction mechanism is depicted in FIG. 3.

If an azeotropic chemical dehydrating agent is used as the chemical dehydrating agent, it can be used in relatively large amounts, for example, from about 1 ml to about 4 ml per gram polyimide polymer. Such a large amount of azeotropic chemical dehydrating agent ensures that the water produced by the monoesterification reaction is removed from the monoesterification reaction solution.

If a carbodiimide is used as the chemical dehydrating agent, it can be used in an amount from about 1 to about 4 times the stoichiometric amount based on the moles of water removed.

The chemical dehydrating agent can also be periodically added to the monoesterification reaction solution throughout step (b). For example, xylene or ODCB can be added periodically. According to one embodiment of the method as described herein, the chemical dehydrating agent is added to the monoesterification reaction solution in three separate batches.

The mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the monoesterification reaction solution from returning to the monoesterification reaction solution is suitable.

If dehydrating conditions are utilized in steps (a) and (b), the dehydrating conditions of step (b) can be the same as the dehydrating conditions of step (a). In fact, it is desirable for the dehydrating conditions to be the same because this simplifies the overall method as described herein. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction of step (a) can be employed in the monoesterification reaction of step (b).

Acid Catalyst

Acid catalysts useful in monoesterification reactions are well known to those of skill in the art. Acid catalysts activate the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which is incorporated by reference in its entirety herein. Exemplary acid catalysts include para-toluene sulfonic acid, sulfuric acid, methanesulfonic acid, triflic acid, and mixtures thereof. If the dehydrating conditions utilized include a carbodiimide, acid catalyst may not be necessary because the carboxyl functional group of the polyimide polymer is activated by the carbodiimide.

It has been discovered that the amount of acid catalyst present during the monoesterification reaction, under dehydrating conditions, also affects the average molecular weight of the monoesterified, polyimide polymer. More particularly, it has been discovered that when the amount of acid catalyst used is less than the conventional amount and dehydrating conditions are present, significantly less molecular weight loss, no molecular weight loss, or even molecular weight gain, occurs. While not wishing to be bound by any particular theory, it is believed that excess acid catalyst augments degradation of the imide rings of the polyimide polymer, which causes undesirable chain scissioning and loss of average molecular weight. If DABA monomers are used in the method as described herein, the amount of acid catalyst can be further reduced from the conventional amount. This is due to the fact that DABA monomers are intrinsically acidic.

From about 0 milligrams to about 2.5 milligrams of acid catalyst can be added to the monoesterification reaction solution per gram of the polyimide polymer without experiencing undesirable molecular weight loss. In other embodiments less than 5.0 milligrams of acid catalyst can be added to the monoesterification reaction solution per gram of the polyimide polymer without experiencing undesirable molecular weight loss.

Monoesterification Conditions

The monoesterification reaction solution, with or without catalyst, is heated to a relatively high temperature over an extended period of time. Generally, the monoesterification reaction solution is heated for approximately 12-30 hours at a temperature from about 120° C. to about 140° C.

In small (volume) scale reactions, the dehydrating conditions can remove water more easily than in large (volume) scale reactions because the surface area to volume ratio of the reaction vessel is higher. Such a higher ratio facilitates boiling of the water.

In large (volume) scale reactions, it is advantageous for both the imidization reaction of step (a) and the monoesterification reaction of step (b) to occur in the same reaction vessel. Then any dehydrating conditions remaining from the imidization reaction can easily be utilized during the monoesterification reaction.

Step (c)—Forming Monoesterified Polyimide Membrane

Step (c) involves forming a monoesterified polyimide membrane or dense film from the monoesterified polyimide polymer. The crosslinked polyimide membrane can be a crosslinked hollow fiber membrane, a crosslinked flat sheet membrane, and the like. The membrane or dense film is formed prior to transterification.

As such, the monoesterified polyimide polymer can be spun to form a hollow fiber membrane. A crosslinked hollow fiber membrane can be made by forming fibers from the crosslinkable polyimide polymer and transesterifying the crosslinkable polyimide polymer within the fibers. More specifically, the crosslinkable polyimide polymer can be formed into crosslinkable fibers, which are then subjected to transesterification conditions to create covalent ester crosslinks within the fibers. Such fibers can be hollow fibers or other types of fibers. Crosslinked hollow fiber membranes can be incorporated into a separation module. Other types of membranes for separation include flat sheet separation membranes or flat stack permeators.

Methods for preparing crosslinked fiber membranes are well known to those of skill in the art. Details for methods for making monoesterified polyimide membranes can be found in U.S. Pat. No. 8,394,182 and U.S. Pat. No. 8,449,651, the contents of which are incorporated by reference in their entirety.

Step (d)—Transesterification Reaction

Step (c) involves subjecting the monoesterified polyimide polymer to transesterification conditions under a $CO_2$ atmosphere, $N_2$ atmosphere, or mixed $CO_2$ and $N_2$ atmosphere to form a crosslinked membrane. In step (c), the —OH groups in esters in one monoesterified polyimide polymer chain react with esters in another monoesterified polyimide polymer chain to form transesters or crosslinks. Any unconverted —COOH groups in one monoesterified polyimide polymer chain can also react with —OH groups in esters in another monoesterified polyimide polymer chain to form crosslinks. In this manner, the transesterification reaction crosslinks the monoesterified polyimide polymer chains.

$CO_2$ Atmosphere

The $CO_2$ atmosphere has either a $CO_2$ pressure (for 100% $CO_2$) or a $CO_2$ partial pressure (for less than 100% $CO_2$). In one embodiment, the $CO_2$ atmosphere has a $CO_2$ pressure or a $CO_2$ partial pressure from about 14.6 psig to about 200 psig. In another embodiment, the $CO_2$ atmosphere has a $CO_2$ pressure or a $CO_2$ partial pressure from about 50 psig to about 75 psig.

The $CO_2$ atmosphere also has a gas flow rate. The gas flow rate can be chosen by one of skill in the art to achieve the desired pressure.

Similar to $CO_2$, if other inert gases are used the inert gas atmosphere can either be a single inert gas or an inert gas mixture and thus having a partial pressure. The pressure of the inert gas and the gas flow rate can be chosen by one of skill in the art.

Transesterification Conditions

Typical transesterification conditions are known in the art. Generally, transesterification can be accomplished by heating the monoesterified polyimide polymer. Heating initiates the transesterification reaction and, additionally, removes residual solvent. In one embodiment, the monoesterified polyimide polymer is heated at a temperature from about 175° C. to about 350° C. In other embodiment, the monoesterified polyimide polymer is heated at a temperature from about 200° C. to about 300° C. Within these temperature ranges, the monoesterified polyimide polymer can be heated at one temperature or more than one temperature. For example, the monoesterified polyimide polymer can be heated at an initial temperature for an initial period of time and then heated at a final temperature for a final period of time. In one embodiment, the monoesterified polyimide polymer is heated at the final temperature for a time from about 2 to about 24 hours. In another embodiment, the monoesterified polyimide polymer is heated at the final temperature for a time from about 2 to about 12 hours Transesterification can also be accomplished by UV or microwave treatment. Furthermore, transesterification reactions can be catalyzed. Transesterification catalyst can be the same acid catalysts used during monoesterification, which include para-toluene sulfonic acid, sulfuric acid, methanesulfonic acid, triflic acid, and mixtures thereof.

Permeance

Conducting the transesterification reaction under an inert gas atmosphere, and specifically a $CO_2$ atmosphere, can advantageously reduce the large loss of permeance generally experienced upon transesterification under a vacuum atmosphere. Accordingly, a membrane (e.g., a hollow fiber membrane) made with transesterification under an inert gas atmosphere, and specifically a $CO_2$ atmosphere, retains permeance better than a membrane made with transesterification under a vacuum atmosphere.

The permeance loss from transesterification under a vacuum atmosphere can be, for example, around 50% and even as high as around 70% or higher. This loss in permeance is illustrated in Example 1 herein.

In one embodiment, less than 50% loss in $CO_2$ permeance is observed after subjecting the monoesterified polyimide polymer to transesterification conditions under $CO_2$ atmosphere to form the crosslinked membrane. In another embodiment, less than 45% loss in $CO_2$ permeance is observed after subjecting the monoesterified polyimide polymer to transesterification conditions under the $CO_2$ atmosphere to form the crosslinked membrane. In another embodiment, less than 40% loss in $CO_2$ permeance is observed after subjecting the monoesterified polyimide polymer to transesterification conditions under the $CO_2$ atmosphere to form the crosslinked membrane. In another embodiment, less than 35% loss in $CO_2$ permeance is observed after subjecting the monoesterified polyimide polymer to transesterification conditions under the $CO_2$ atmosphere to form the crosslinked membrane. In a further embodiment, less than 30% loss in $CO_2$ permeance is observed after subjecting the monoesterified polyimide polymer to transesterification conditions under the $CO_2$ atmosphere to form the crosslinked membrane. In yet another embodiment, less than 25% loss in $CO_2$ permeance is observed after subjecting the monoesterified polyimide polymer to transesterification conditions under the $CO_2$ atmosphere to form the crosslinked membrane. In general for comparison as described herein, gas permeances are measured using pure $CO_2$ gas, with a pressure of approximately 100 psig and at room temperature (~25° C.).

The $CO_2$ permeance of the crosslinked membrane made as described herein is measurably greater than a comparative $CO_2$ permeance of a comparative crosslinked membrane made identically but where transesterification occurs under a vacuum atmosphere instead of under the $CO_2$ atmosphere. The $CO_2$ permeance of the crosslinked membrane can be about 8% to about 40% greater than a comparative $CO_2$ permeance of a comparative crosslinked membrane made identically but where transesterification occurs under a vacuum atmosphere instead of under the $CO_2$ atmosphere. Alternatively, the $CO_2$ permeance of the crosslinked membrane can be about 10% to about 30% greater than a comparative $CO_2$ permeance of a comparative crosslinked membrane made identically but where transesterification occurs under a vacuum atmosphere instead of under the $CO_2$ atmosphere. As another alternative, the $CO_2$ permeance of the crosslinked membrane can be about 10% to about 20% greater than a comparative $CO_2$ permeance of a comparative crosslinked membrane made identically but where transesterification occurs under a vacuum atmosphere instead of under the $CO_2$ atmosphere. As yet another alternative, the $CO_2$ permeance of the crosslinked membrane is at least 10% greater than a comparative $CO_2$ permeance of a comparative crosslinked membrane made identically but where transesterification occurs under a vacuum atmosphere instead of under the $CO_2$ atmosphere. In general comparative permeances, as described herein, can be measured with a mixed gas 50% $CO_2$/50% $CH_4$, with a pressure of approximately 100-500 psig and at a temperature of approximately 35° C.

Permeance loss can be measured as described in the following Examples and in U.S. Pat. No. 6,932,859, the contents of which are hereby incorporated by reference in their entirety. In general for comparison, gas permeances can be measured using pure $CO_2$ gas, with a pressure of approximately 100 psig and at room temperature (~25° C.). Gas permeances can also be measured with a mixed gas 50% $CO_2$/50% $CH_4$, with a pressure of approximately 100-500 psig and at approximately 35° C. For the comparative permeances as described herein, a mixed gas 50% $CO_2$/50% $CH_4$, with a pressure of approximately 100-500 psig and at a temperature of approximately 35° C. is utilized.

In an embodiment, the $CO_2$ permeance of the crosslinked membrane at about 35° C. and from about 100 psig to about 500 psig is from about 80 GPU to about 130 GPU. In another embodiment, the $CO_2$ permeance of the crosslinked membrane at about 35° C. and from about 100 psig to about 500 psig is from about 100 GPU to about 130 GPU.

Selectivity

The crosslinked membrane prepared under a $CO_2$ atmosphere as described herein also retains good selectivity (e.g., $CO_2/CH_4$ selectivity). Selectivity is measured by taking the ratio of gas permeance. For example, for $CO_2/CH_4$ selectivity is the ratio of $CO_2$ permeance over $CH_4$ permeance. As described above, gas permeances can be measured with a mixed gas 50% $CO_2$/50% $CH_4$, with a pressure of approximately 100-500 psig and at approximately 35° C. Selectivity measurements are also described in U.S. Pat. No. 6,932,859, the contents of which are incorporated by reference in their entirety.

The $CO_2/CH_4$ selectivity of a crosslinked membrane prepared under a $CO_2$ atmosphere as described herein can substantially the same and even greater than the selectivity of a crosslinked membrane prepared identically except for using a vacuum atmosphere. In one embodiment, the $CO_2/CH_4$ selectivity of a crosslinked membrane prepared under a $CO_2$ or a $N_2$ atmosphere is up to about 10% greater than the selectivity of a crosslinked membrane prepared identically except for using a vacuum atmosphere. In another embodiment, the $CO_2/CH_4$ selectivity of a crosslinked membrane prepared under a $CO_2$ or a $N_2$ atmosphere is up to about 15% greater than the selectivity of a crosslinked membrane prepared identically except for using a vacuum atmosphere.

In an embodiment, the $CO_2/CH_4$ selectivity of the crosslinked membrane at about 35° C. and from about 100 psig to about 500 psig is from about 20 to about 40. In another embodiment, the $CO_2/CH_4$ selectivity of the crosslinked membrane at about 35° C. and from about 100 psig to about 500 psig is from about 30 to about 40.

Form of Membrane

The crosslinked membrane can take any form known in the art, for example, a hollow fiber membrane, tubular shaped membrane, and other membrane shapes. Other membrane shapes include spiral wound membranes, pleated membranes, flat sheet membranes, and polygonal membranes.

The monoesterified polyimide polymer can also be cast to form sheets or films. The sheets or films can be cast onto a suitable support to provide a composite sheet. The sheets and films can be cast onto a sheet of another polymer. This polymer support can be a porous and low cost polymer. As such, this porous polymer can be used as a support for a less porous sheet or film formed from the monoesterified polyimide polymer.

Hollow Fiber Membrane

In one embodiment, the crosslinked membrane is a crosslinked hollow fiber membrane. A crosslinked hollow fiber membrane comprises individual fibers of crosslinked polyimide polymer chains.

When the crosslinked membrane is a crosslinked hollow fiber membrane, the method of making the membrane disclosed herein further comprises forming monoesterified hollow fiber from the monoesterified polyimide polymer and subjecting the monoesterified hollow fiber to the transesterification conditions under the $CO_2$ atmosphere or the $N_2$ atmosphere to form the crosslinked hollow fiber membrane. Transesterification of the monoesterified hollow fiber causes —OH groups in esters in one monoesterified polyimide polymer chain within a fiber to react with esters in another monoesterified polyimide polymer chain within the same fiber to form a transester or crosslink.

Forming monoesterified hollow fiber from the monoesterified polyimide polymer generally involves spinning the monoesterified polyimide polymer from a spinning dope. The spinning process can be a wet-quench/dry-jet spinning process. While a wet-quench/dry-jet spinning process is discussed in detail below, it should be appreciated that other types of spinning methods (e.g., wet spinning) can be used to form the monoesterified hollow fiber.

The spinning dope is a homogeneous one phase solution and can comprise the monoesterified polyimide polymer, a volatile component, an optional inorganic additive, a spinning solvent, and a spinning non-solvent.

Polymer concentration is a matter of concern. Sufficient polymer must be present to form strong fibers and membranes capable of withstanding high pressures. However, too much polymer increases resistance in the membrane substructure and adversely affects membrane performance. In one embodiment of the method as described herein, the monoesterified polyimide polymer is present in the spinning dope in an amount from about 20 to about 50 weight percent. In another embodiment, the monoesterified polyimide polymer is present in the spinning dope in an amount from about 25 to about 45 weight percent. In yet another embodiment, the monoesterified polyimide polymer is present in the spinning dope in an amount from about 30 to about 40 weight percent.

The volatile component can be an organic solvent with a specified room temperature vapor pressure and a specified boiling point. Such an organic solvent aids in the formation of the dense skin separation layer of the hollow fiber. It effectively and efficiently evaporates during the dry-jet step of the wet-quench/dry-jet spinning process and evaporation on the outside of the nascent fiber is believed to help keep the polymer chains more entangled and at a higher concentration, which promotes vitrification and formation of the dense skin. The specified room temperature vapor pressure of the organic solvent can be greater than about 0.05 bar. Alternatively, the specified room temperature vapor pressure can be greater than about 0.1 bar. As another alternative, the specified room temperature vapor pressure can be greater than about 0.2 bar. The specified boiling point of the organic solvent can be from about 30° C. to about 100° C. Alternatively, the specified boiling point can be from about 40° C. to about 90° C. As another alternative, the specified boiling point can be from about 50° C. to about 70° C.

Exemplary organic solvents include tetrahydrofuran (THF) and acetone. In one embodiment of the method as described herein, the volatile component is present in the spinning dope in an amount from about 5 to about 25 weight percent. In another embodiment, the volatile component is present in the spinning dope in an amount from about 5 to about 20 weight percent. In yet another embodiment, the volatile component is present in the spinning dope in an amount from about 10 to about 15 weight percent.

The optional inorganic additive can enhance phase separation, increase substructure porosity, and increase viscosity of the spinning dope. Since the monoesterified, polyimide polymer has a large quantity of carboxyl functional groups, it is more hydrophilic than most traditional polymers used in spinning processes. Therefore, it takes a longer time for the monoesterified polyimide polymer to separate during the wet-quench step. The optional inorganic additive reduces the time necessary for phase separation of the monoesterified polyimide polymer.

The optional inorganic additive can be an antilyotropic salt. Exemplary antilyotropic salts include $LiNO_3$, $LiClO_4$, $MgCl_2$, $ZnCl_2$, and $NaI$.

Concentration of the inorganic additive is also a matter of concern. While the inorganic additive can reduce the time required for phase separation, it is believed that excess inorganic additive (e.g. $LiNO_3$) can cause defect formation if the porosity extends into the non-vitrified skin layer of the hollow fiber. In one embodiment of the method as described herein, the concentration of antilyotropic salt in the spinning dope is from about 0 to about 10 weight percent. In another embodiment, the concentration of the antilyotropic salt in the spinning dope is from about 2 to about 8 weight percent. In yet another embodiment, the concentration of the antilyotropic salt in the spinning dope is from about 4 to about 7 weight percent.

The spinning solvent can be a high boiling organic solvent. Exemplary high boiling organic solvents are listed in Table 1 above, along with their normal boiling points. A high boiling organic solvent that has a high affinity for water can enhance phase separation of the hollow fiber in the wet-quench step of the spinning process. NMP is a particularly desirable spinning solvent because it dissolves many polymers used in spinning, is relatively benign compared to other spinning solvents, and has a high affinity for water. The concentration of the spinning solvent can be dependent upon many factors, including the molecular weight of the monoesterified polyimide polymer, the polydispersity index of the monoesterified polyimide polymer, and the other components of the spinning dope, and can be determined by the precipitation method discussed below. The concentration of the spinning solvent can be, for example, from about 25 to about 35 weight percent.

The spinning non-solvent can be an alcohol, such as an aliphatic alcohol, or water. In one embodiment of the method as described herein, the spinning non-solvent is a lower boiling aliphatic alcohol, for example, methanol or ethanol. The normal boiling points of methanol and ethanol are 64.7° C. and 78.4° C., respectively. Some spinning non-solvents (e.g. ethanol) can also serve as an additional volatile component. The concentration of the spinning non-solvent is directly dependent upon the spinning solvent concentration and can also be determined by the precipitation method discussed below. The concentration of the spinning non-solvent can be, for example, from about 15 to about 25 weight percent.

The concentrations of spinning solvent and spinning non-solvent can be determined by an iterative precipitation method wherein the concentrations of the spinning solvent and the spinning non-solvent are dependent upon the respective concentrations of the monoesterified polyimide polymer, the volatile component, and the optional inorganic additive. Such precipitation method ensures that the spinning dope is a homogeneous one-phase solution, but is still close to the point of precipitation in order to reduce the phase separation time during the wet-quench step.

According to the precipitation method, the concentrations of the monoesterified polyimide polymer, the volatile component, and the optional inorganic additive are set. Initial concentrations of the spinning solvent and the spinning non-solvent are then chosen. The components, in these concentrations, are combined in a small sample vial. First, the volatile component, the spinning solvent, and the spinning non-solvent are mixed to form a solution. Next, the optional inorganic additive is added to the solution. After the optional inorganic additive dissolves in the solution, the monoesterified polyimide polymer is added to the solution to provide a spinning dope sample. The polymer can be added in batches to facilitate dispersion of the polymer throughout the solution. If the polymer precipitates out, the spinning solvent concentration is increased anywhere from about 0 weight percent to about 5 weight percent to arrive at the final spinning solvent concentration. The spinning non-solvent concentration is similarly decreased to arrive at the final spinning non-solvent concentration. If the polymer does not precipitate out, the concentration of the spinning solvent and/or the spinning non-solvent is altered and the precipitation test is repeated. Iterations occur until final concentrations are obtained that provide a homogeneous one-phase spinning dope close to the point of precipitation.

A larger amount of spinning dope can be prepared according to these final concentrations. It is advantageous to carry out the precipitation method with small sample amounts of spinning dope before spinning any batch of the spinning dope because the point of precipitation can vary as the structure and/or average molecular weight of the polymer varies.

If a dry-jet/wet-quench spinning process is used to spin the monoesterified polyimide polymer into hollow fibers, several benefits can be realized. First, the hollow fibers can be spun at higher take-up rates. Second, the dry jet step can increase chain entanglement, which hypothetically forms skin on the hollow fibers. Third, the polymer can increase dope viscosity, which allows the spinning dope to be spun at elevated dope temperatures. Such elevated dope temperatures are required for evaporative skin formation.

Dry-jet/wet-quench spinning processes are well known in the art. Generally, in a dry-jet/wet-quench spinning process, spinning dope comprising a polymer is extruded into filaments through orifices of a spinneret, which is separated from a coagulating bath by a gaseous layer or non-coagulating liquid. The filaments are passed through the gaseous layer, such as air, or non-coagulating liquid, such as toluene or heptane, and then conducted into a coagulating bath. Conveyance of the filaments through the gaseous layer is commonly referred to as the dry-jet step. The coagulating bath can be an either an aqueous system, such as pure water, or a non-aqueous system, such as methanol. Conveyance of the filaments through the coagulating bath is commonly referred to as the wet-quench step. After the filaments leave the coagulating bath, they can be washed. Washing is especially important if the coagulating bath contains any acid and can be accomplished with water alone or combinations of alkaline solutions and water. The filaments are dried and wound on a rotating drum.

According to an embodiment of the method described herein, a monoesterified polyimide polymer is extruded through orifices of a spinneret to provide a hollow fiber. This hollow fiber is conveyed through a gaseous layer of air and through a coagulating bath of de-ionized water. The fibers exit the de-ionized water bath and are wound around a take-up drum.

The take-up drum can be partially contained in a vessel of room temperature de-ionized water in order to keep the fiber wet. The fiber can be left on the take-up drum for from about 10 minutes to about 20 minutes and then cut into strands and left in another de-ionized water bath for from about 2 days to about 3 days. The de-ionized water baths help remove solvent from the fiber. The fibers can then be dehydrated by fluid exchange with non-solvents of decreasing surface tension, for example, ethanol and hexane. Ultimately, the fibers can be air-dried and/or oven-dried.

According to the method as described herein, the spinneret orifices can have smaller dimensions than those used in conventional spinning processes. Smaller spinneret dimensions permit spinning of hollow fibers under normal conditions into fibers useful for making membranes that can be used under high pressure conditions (i.e. fibers with a diameter of less than 300 microns). The smaller spinneret dimensions also improve mixing in the spinneret and shearing during extrusion. Further, the smaller spinneret dimensions increase the extrusion velocity and consequently decrease the draw ratio (i.e. the take-up rate divided by the extrusion rate). Reduced draw ratios are desirable because excessively high draw ratios can induce high orientation/elongation stresses, which may be detrimental during further processing like crosslinking. For example, it was found that when hollow fibers were spun with a spinneret having larger dimensions, high draw ratios had to be applied to achieve fibers of reasonable dimensions (less than 300 microns) and these fibers became defective after crosslinking.

The annular diameter of the spinneret orifices can be approximately half the size of conventional spinneret orifices. For example, the annular diameter can be from about 600 microns to about 1300 microns and the bore needle outer diameter can be from about 300 microns to about 700 microns.

The draw ratio can be less than 150. Alternatively, the draw ratio can be less than 100. As another alternative, the draw ratio can be less than 50. As still another alternative, the draw ratio can be less than 10.

The distance between the point of extrusion out of the spinneret and the surface of the de-ionized water bath is referred to herein as the "air gap height." The air gap height must be greater than 0 cm. The air gap height can be from about 1 cm to about 5 cm. Alternatively, the air gap height can be from about 1 cm to about 10 cm. As another alternative, the air gap height can be from about 1 cm to about 20 cm. Larger air gap heights favor skin formation.

Similarly, relatively high spinning dope temperatures (i.e. the temperature of the spinning dope just before extrusion through the spinneret) favor skin formation. The spinning dope temperature can be greater than 40° C. Alternatively, the spinning dope temperature can be greater than 50° C. As yet another alternative, the spinning dope temperature can be greater than 60° C.

As stated above, according to one embodiment, the coagulating bath contains de-ionized water. A sufficiently high coagulating bath temperature ensures adequate phase separation in the coagulating bath. If phase separation is inadequate, the fibers will be crushed in the first guide roll after extrusion. The coagulating bath temperature can be from about 10° C. to about 70° C. Alternatively, the coagulating bath temperature can be from about 25° C. to about 60° C. As another alternative, the coagulating bath temperature can be from about 40° C. to about 50° C.

The take-up rate (i.e. the speed at which the hollow fibers are wound around the take-up drum) can be much greater than take-up rates used when spinning low molecular weight polymers. This is due to the fact that the high molecular weight polymers as described herein can withstand the greater stresses associated with higher take-up rates. The take-up rate can be increased with a fixed extrusion rate if a smaller diameter fiber is required. Take-up rates form about 20 m/min to about 150 m/min (e.g. from about 20 m/min to about 70 m/min) are achievable according to the method as described herein.

The face velocity of air surrounding the spinneret can be greater than 50 ft/min. Alternatively, the face velocity of air surrounding the spinneret can be greater than 80 ft/min. As another alternative, the face velocity of air surrounding the spinneret can be greater than 100 ft/min.

EXAMPLES

Example 1: Transesterification Under Vacuum Atmosphere

The uncrosslinked hollow fiber was formed using a spinning solution (dope) containing 28 wt % monoesterified polyimide (i.e. 6FDA dianhydride (4,4'[Hexafluoroisopropylidene] diphthalic anhydride) and a 3:2 ratio of DAM (2,4,6-trimethyl-1,3 phenylene diamine) to DABA (diamino benzoic acid) diamines 38.5 wt % N-methyl-2-pyrilodinone (NMP), 15.1 wt % ethanol, 15.4% tetrahydrofuran (THF) and a viscosity enhancing salt (LiNO3) of 3 wt % was mixed to form a homogenous solution. The dope was rolled in a sealed container for 7 days to ensure complete mixing. The dope was then allowed to degas for 24 hours before being poured into an ISCO® syringe pump, where it was again degassed for 48 hours. The dope was extruded from an annular spinneret at 200 mL/hr through an air gap into a quench bath filled with deionized water and taken up on a rotating drum at between 50 m/min. A solution consisting of 83% NMP with 17% DI water was used as the bore fluid. The fibers were kept wetted with DI water while on the take-up drum. The fibers were cut from the drum with a razor to lengths of one meter and washed in DI Water for 36 hours. After washing in water, the fibers were washed in baths of ethanol (2×30 min) and hexane (2×30 min). The hexane-wet fibers were allowed to air dry for 30 minutes and then dried under vacuum at 75° C. for one hour.

This example illustrates significant reduction in $CO_2$ permeance upon transesterification under a vacuum atmosphere. The transesterification conditions under a vacuum atmosphere set forth in Table 2 provided a crosslinked hollow fiber membrane having a $CO_2$ permeance 50% lower than the uncrosslinked hollow fiber.

TABLE 2

| Crosslinking condition (if applicable) | $CO_2$ Permeance (GPU) |
|---|---|
| Testing conditions (feed gas): Pure $CO_2$ gas, 100 psig and room temperature (~25° C.) | |
| Uncrosslinked fiber | 165 |
| Crosslinked under vacuum by heating for 2 hours at 200° C. | 83 |
| Testing conditions (feed gas): 50% $CO_2$/50% $CH_4$, 100 psig and 35° C. | |
| Uncrosslinked fiber | 170 |
| Crosslinked under vacuum by heating for 2 hours at 200° C. | 91 |

Example 2: Transesterification Under $CO_2$ Atmosphere Compared to Vacuum Atmosphere This example compares $CO_2$ permeance and $CO_2/CH_4$ selectivity with transesterification under a $CO_2$ atmosphere versus transesterification under a vacuum atmosphere for two sets of hollow fibers.

The uncrosslinked hollow fiber was formed using a spinning solution (dope) containing 28 wt % monoesterified polyimide (i.e. 6FDA dianhydride (4,4'-[Hexafluoroisopropylidene]diphthalic anhydride) and a 3:2 ratio of DAM (2,4,6-trimethyl-1,3 phenylene diamine) to DABA (diamino benzoic acid) diamines 38.5 wt % N-methyl-2-pyrilodinone (NMP), 15.1 wt % ethanol, 15.4% tetrahydrofuran (THF) and a viscosity enhancing salt (LiNO3) of 3 wt % was mixed to form a homogenous solution. The dope was rolled in a sealed container for 7 days to ensure complete mixing. The dope was then allowed to degas for 24 hours before being poured into an ISCO® syringe pump, where it was again degassed for 48 hours. The dope was extruded from an annular spinneret at 200 mL/hr through an air gap into a quench bath filled with deionized water and taken up on a rotating drum at between 50 m/min. A solution consisting of 83% NMP with 17% DI water was used as the bore fluid. The fibers were kept wetted with DI water while on the take-up drum. The fibers were cut from the drum with a razor to lengths of one meter and washed in DI Water for 36 hours. After washing in water, the fibers were washed in baths of ethanol (2×30 min) and hexane (2×30 min). The hexane-wet fibers were allowed to air dry for 30 minutes and then dried under vacuum at 75° C. for one hour.

For the first set of hollow fibers, the transesterification conditions under a $CO_2$ atmosphere set forth in Table 3 provided a crosslinked hollow fiber membrane having a $CO_2$ permeance about 40% higher than that of a crosslinked hollow fiber membrane prepared with the transesterification conditions under a vacuum atmosphere set forth in Table 3. The $CO_2/CH_4$ selectivities for the respectively prepared hollow fiber membranes in the first fiber set were comparable. For the second set of hollow fibers, the transesterification conditions under a $CO_2$ atmosphere set forth in Table 3 provided a crosslinked hollow fiber membrane having a $CO_2$ permeance almost 10% higher than that of a crosslinked hollow fiber membrane prepared with the transesterification conditions under a vacuum atmosphere set forth in Table 3. Again, the $CO_2/CH_4$ selectivities for the respectively prepared hollow fiber membranes in the second fiber set were comparable.

TABLE 3

| Crosslinking conditions | $CO_2$ Permeance (GPU) | $CO_2/CH_4$ |
|---|---|---|
| Testing conditions (feed gas): 50% $CO_2$/50% $CH_4$, 100 psig and 35° C. Fiber Set-1 | | |
| Crosslinked under vacuum (Temperature profile: 150° C. (2 hours)-220° C. (2 hours)) | 91 | 35 |
| Crosslinked under $CO_2$ with 50 psig, 500 ccm at 220° C. (2 hours) | 128 | 38 |
| Testing conditions (feed gas): 100% $CO_2$, 100 psig and room temperature (~25° C.) | | |
| Crosslinked under vacuum (Temperature profile: 150° C. (2 hours)-220° C. (2 hours)) | 83 | |

TABLE 3-continued

| Crosslinking conditions | $CO_2$ Permeance (GPU) | $CO_2/CH_4$ |
|---|---|---|
| Crosslinked under $CO_2$ with 50 psig, 500 ccm at 200° C. (2 hours) | 102 | |

Example 3: Varying Transesterification Conditions Under $CO_2$ Atmosphere

This example compares $CO_2$ permeance and $CO_2/CH_4$ selectivity with transesterification under a $CO_2$ atmosphere varying transesterification conditions. Uncrosslinked hollow fiber membrane was prepared as described in Example 2. Hollow fiber membranes were prepared by transesterification under the identical conditions set forth in Table 4 except for varying $CO_2$ pressure resulted in better $CO_2$ permeance and comparable $CO_2/CH_4$ selectivity at lower $CO_2$ pressure. Also, hollow fiber membranes prepared by transesterification under a $CO_2$ atmosphere having the same $CO_2$ pressure but varying temperature and $CO_2$ gas flow rate resulted in better $CO_2$ permeance and comparable $CO_2/CH_4$ selectivity with lower $CO_2$ flow rate and temperature.

TABLE 4

| Crosslinking conditions | $CO_2$ Permeance (GPU) | $CO_2/CH_4$ |
|---|---|---|
| Testing conditions (feed gas): 50% $CO_2$/50% $CH_4$, 500 psig and 35° C. Effect of $CO_2$ gas pressure | | |
| Crosslinked under $CO_2$ with 50 psig, 500 ccm at 220° C. (2 hours) | 99 | 30 |
| Crosslinked under $CO_2$ with 75 psig, 500 ccm at 220° C. (2 hours) | 89 | 25 |
| Effect of varying crosslinking temperature and gas flow rate | | |
| Crosslinked under $CO_2$ with 50 psig, 500 ccm at 220° C. (2 hours) | 99 | 30 |
| Crosslinked under $CO_2$ with 50 psig, 1000 ccm at 300° C. (2 hours) | 86 | 31 |

What is claimed is:

1. A method of making a crosslinked polyimide membrane or dense film comprising:
   (a) preparing a polyimide polymer comprising carboxylic acid functional groups from a reaction solution comprising monomers and at least one solvent;
   (b) treating the polyimide polymer with a diol at esterification conditions to form a monoesterified polyimide polymer;
   (c) forming a monoesterified polyimide membrane or dense film from the monoesterified polyimide polymer; and
   (d) subjecting the monoesterified polyimide membrane or dense film to transesterification conditions under a $CO_2$ atmosphere to form a crosslinked polyimide membrane or dense film.

2. The method of claim 1, wherein the crosslinked membrane is a crosslinked hollow fiber membrane.

3. The method of claim 2, wherein the $CO_2$ permeance of the crosslinked hollow fiber membrane at about 35° C. and from about 100 psig to about 500 psig is from about 80 GPU to about 130 GPU.

4. The method of claim 2, wherein the $CO_2$ permeance of the crosslinked hollow fiber membrane at about 35° C. and from about 100 psig to about 500 psig is from about 100 GPU to about 130 GPU.

5. The method of claim 2, wherein the $CO_2/CH_4$ selectivity of the crosslinked hollow fiber membrane at about 35° C. and from about 100 psig to about 500 psig is from about 20 to about 40.

6. The method of claim 2, wherein the $CO_2/CH_4$ selectivity of the crosslinked hollow fiber membrane at about 35° C. and from about 100 psig to about 500 psig is from about 30 to about 40.

7. The method of claim 1, wherein the $CO_2$ atmosphere is a pure $CO_2$ atmosphere.

8. The method of claim 1, wherein the $CO_2$ atmosphere contains majority $CO_2$ and one or more additional nonreactive gases.

9. The method of claim 1, wherein the $CO_2$ atmosphere has a $CO_2$ pressure or a $CO_2$ partial pressure from about 14.6 psig to about 200 psig.

10. The method of claim 9, wherein the $CO_2$ pressure or the $CO_2$ partial pressure is from about 50 psig to about 75 psig.

11. The method of claim 1, wherein the transesterification conditions comprise heating at a temperature from about 175° C. to about 350° C.

12. The method of claim 11, wherein the temperature is from about 200° C. to about 300° C.

13. The method of claim 11, wherein the transesterification conditions comprise heating for a time from about 2 to about 24 hours.

14. The method of claim 13, wherein the time is from about 2 to about 12 hours.

15. The method of claim 1, wherein the monomers comprise:
   (i) dianhydride monomers;
   (ii) diamino monomers without carboxylic acid functional groups; and
   (iii) diamino monomers with carboxylic acid functional groups.

16. The method of claim 15, wherein the dianhydride monomers are of a formula (I):

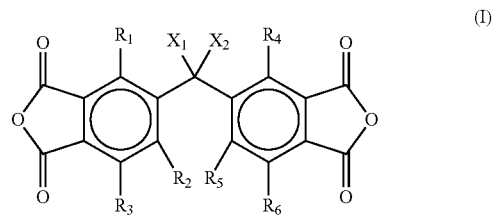

wherein
   $X_1$ and $X_2$ are independently halogenated alkyl, phenyl or halogen;
   $R_1$, $R_2$, $R_3$, $R_4$, $R_5$, and $R_6$ are independently H, alkyl, or halogen.

17. The method of claim 15, wherein the diamino monomers without carboxylic acid functional groups are selected from the group consisting of 4,4' isopropylidene dianiline; 3,3' hexafluoroisopropylidene dianiline; 4,4' hexafluoroisopropylidene dianiline; 4,4' oxydianiline; 3,3' oxydianiline; 4,4' diaminodiphenyl; diaminotoluene; diaminobenzotrifluoride; dimethyldiaminobenzene; trimethyldiaminobenzene; tetramethyldiaminobenzene; 2,4,6-trimethyl-m-phenylenediamine (DAM); and combinations thereof.

18. The method of claim 15, wherein the diamino monomers with carboxylic acid functional groups are of a formula (II):

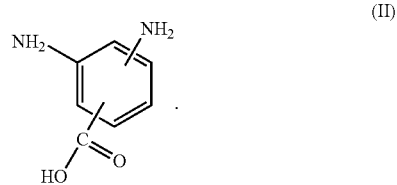

19. The method of claim 15, wherein the dianhydride monomers are 4,4'-(hexafluoroisopropylidene) diphthalic anhydride (6FDA), the diamino monomers without carboxylic acid functional groups are 2,4,6-trimethyl-m-phenylenediamine (DAM), and the diamino monomers with carboxylic acid functional groups are 3,5-diaminobenzoic acid (DABA).

20. The method of claim 1, wherein less than 25% loss in $CO_2$ permeance is observed after subjecting the monoesterified polyimide membrane to transesterification conditions under the $CO_2$ atmosphere to form the crosslinked polyimide membrane.

21. The method of claim 1, wherein the $CO_2$ permeance of the crosslinked polyimide membrane is about 10 to about 30% greater than a comparative $CO_2$ permeance of a comparative crosslinked hollow fiber membrane made identically but where transesterification occurs under a vacuum atmosphere instead of under the $CO_2$ atmosphere.

* * * * *